(12) United States Patent
Hama

(10) Patent No.: US 10,602,011 B2
(45) Date of Patent: Mar. 24, 2020

(54) IMAGE FORMING APPARATUS, INFORMATION PROCESSING METHOD, AND PROGRAM

(71) Applicant: CANON KABUSHIKI KAISHA, Tokyo (JP)

(72) Inventor: Mikio Hama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/164,496

(22) Filed: Oct. 18, 2018

(65) Prior Publication Data

US 2019/0124212 A1    Apr. 25, 2019

(30) Foreign Application Priority Data

Oct. 23, 2017   (JP) ................... 2017-204703

(51) Int. Cl.
    *H04N 1/00*        (2006.01)
(52) U.S. Cl.
    CPC ....... *H04N 1/0097* (2013.01); *H04N 1/00482* (2013.01); *H04N 1/00517* (2013.01); *H04N 2201/0094* (2013.01)
(58) Field of Classification Search
    CPC ............. H04N 1/0097; H04N 1/00482; H04N 1/00517; H04N 2201/0094
    USPC ...................................... 358/1.13
    See application file for complete search history.

(56) References Cited

U.S. PATENT DOCUMENTS

| 2011/0199640 A1* | 8/2011 | Shirai ................... G06F 3/1204 358/1.15 |
| 2013/0033714 A1* | 2/2013 | Nakagawa ............ G06F 3/1205 358/1.9 |
| 2014/0233056 A1* | 8/2014 | Onsen ................ H04N 1/00278 358/1.15 |
| 2015/0227333 A1* | 8/2015 | Tanaka .................. G06F 3/1267 358/1.15 |
| 2018/0048781 A1* | 2/2018 | Kogure ............... H04N 1/00424 |
| 2018/0077305 A1* | 3/2018 | Nishio ............... H04N 1/00503 |
| 2018/0091682 A1* | 3/2018 | Kamasuka .......... H04N 1/00244 |

FOREIGN PATENT DOCUMENTS

JP         2008-98944 A       4/2008

* cited by examiner

*Primary Examiner* — Allen H Nguyen
(74) *Attorney, Agent, or Firm* — Canon U.S.A., Inc., IP Division

(57) ABSTRACT

An image forming apparatus has a job execution unit that executes a job that causes an image to be formed. The job execution unit acquires, from a function extension unit that extends a function of the job execution unit, first setting information managed by the function extension unit. When the job execution unit receives an instruction to execute the job, the job execution unit controls the function extension unit to perform the extended function of the job execution unit based on the acquired first setting information.

18 Claims, 17 Drawing Sheets

FIG. 3C

PLUG-IN SETTING

```
INTENSITY: 2
CORRECTION METHOD: DOCUMENT
                    ORIENTATION
```
— 302a, 302

FIG. 3D

PLUG-IN SETTING

```
INTENSITY: 3
```
— 302b, 302

FIG. 3E

DEVICE CONTROL APPLICATION NAME: COPY — 308

ENLARGEMENT RATIO: 100%
COLOR MODE: MONOCHROME
NUMBER OF COPIES: 1
DENSITY: 3
DUPLEX PRINTING: SIMPLEX

PREINSTALLED IMAGE PROCESSING: NO

PLUG-IN IMAGE PROCESSING:
"Correct Slant"

— 309

IMAGE PROCESSING NAME: Correct Slant — 310

INTENSITY: 2
CORRECTION METHOD: DOCUMENT
                    ORIENTATION

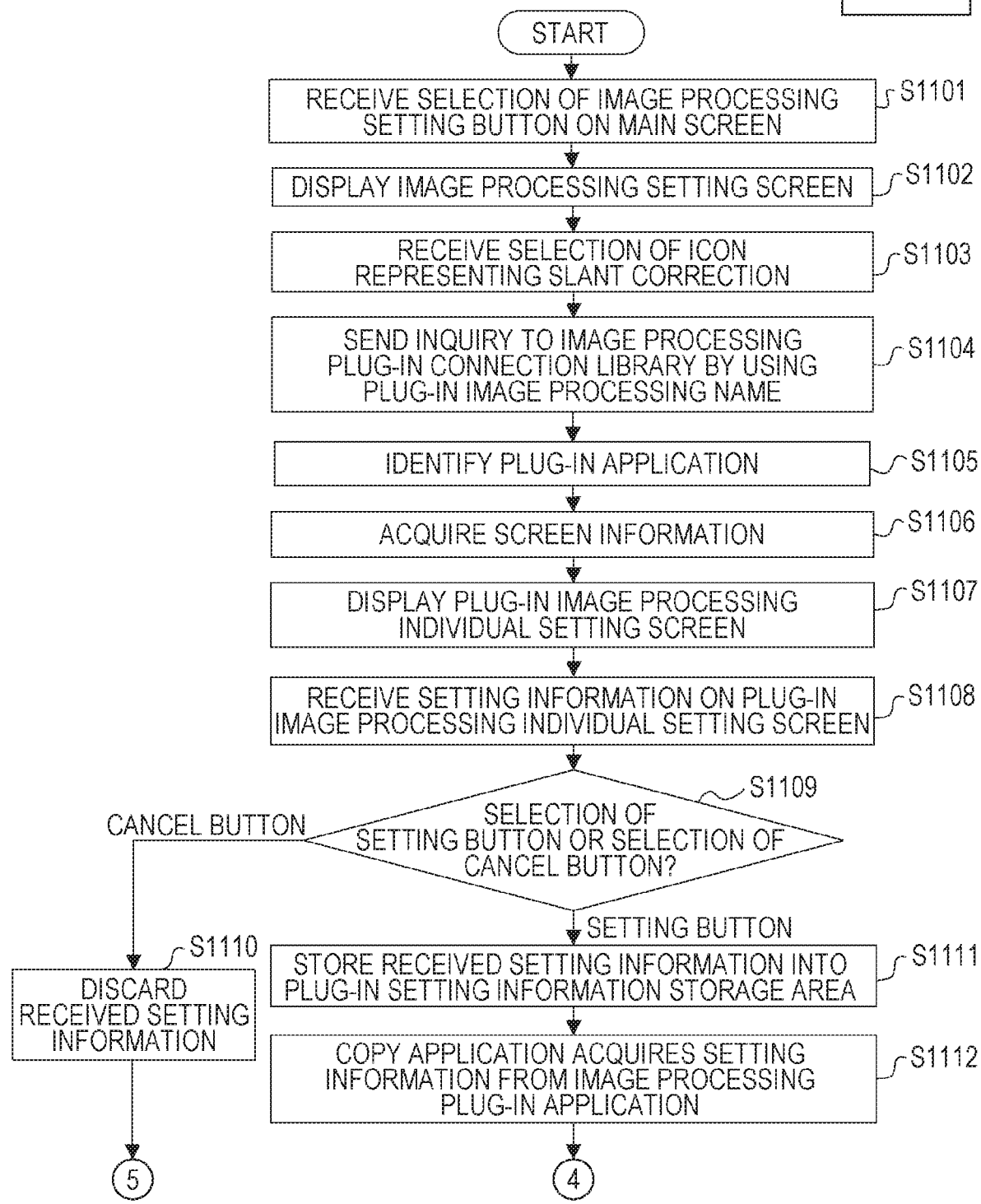

IMAGE FORMING APPARATUS, INFORMATION PROCESSING METHOD, AND PROGRAM

BACKGROUND

Field

The present disclosure relates to an image forming apparatus, an information processing method, and a program.

Description of the Related Art

Japanese Patent Laid-Open No. 2008-98944 discloses an image forming apparatus where a function corresponding to a plug-in module can be added by adding a plug-in module.

On the other hand, there is an image forming apparatus that has a "frequently used setting" function where scan settings that are frequently used by a user are stored in the image forming apparatus and the scan settings are called back when scanning is performed. Further, there is an image forming apparatus that has a "setting history" function where the image forming apparatus stores scan settings that are used last time by a user and calls back the scan settings when performing scanning.

However, setting information of a plug-in application is managed for each plug-in application, so that the settings of the plug-in application cannot be called back by the "frequently used setting" function or the "setting history" function. Therefore, even when a user uses the "frequently used setting" function and/or the "setting history" function, the user needs to reconfigure the "frequently used setting" function and/or the "setting history" function for the plug-in application, so that convenience of the user is reduced.

SUMMARY

An image forming apparatus has a job execution unit that executes a job that causes an image to be formed. The job execution unit acquires, from a function extension unit that extends a function of the job execution unit, first setting information managed by the function extension unit. When the job execution unit receives an instruction to execute the job, the job execution unit controls the function extension unit to perform the extended function of the job execution unit based on the acquired first setting information.

Further features will become apparent from the following description of exemplary embodiments (with reference to the attached drawings).

BRIEF DESCRIPTION OF THE DRAWINGS

FIGS. 3C to 3E are diagrams showing an example of a structure of an area where setting information is stored.

FIGS. 11A and 11B are a flowchart showing an example of processing related to setting history storage.

DESCRIPTION OF THE EMBODIMENTS

Figure 1:
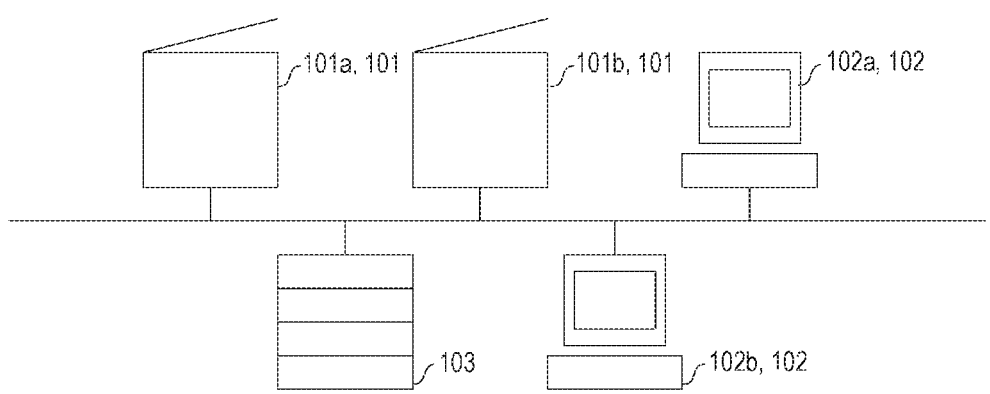
FIG. 1 is a diagram showing an example of a configuration of an image forming system.

First, an image forming system will be described with reference to FIG. 1. FIG. 1 is a diagram showing an example of a configuration of an image forming system. The image forming system has image forming apparatuses 101, information terminals 102, and a server 103. The image forming apparatuses 101, the information terminals 102, and the server 103 are connected to each other by a network.

The image forming apparatus 101 can read an image by using a scanner included in the image forming apparatus 101 and can print the read image. Further, the image forming apparatus 101 can print data received from the information terminal 102 and can transmit the image read by the scanner of the image forming apparatus 101 to the information terminal 102. As the image forming apparatus 101, for example, an MFP (Multi Function Peripheral) is used.

The image forming system in FIG. 1 has a first image forming apparatus 101a and a second image forming apparatus 101b as the image forming apparatuses 101. However, the number of the image forming apparatuses 101 is not limited to two. The image forming system in FIG. 1 has a first information terminal 102a and a second information terminal 102b as the information terminals 102. However, the number of the information terminals 102 is not limited to two.

Figure 2:
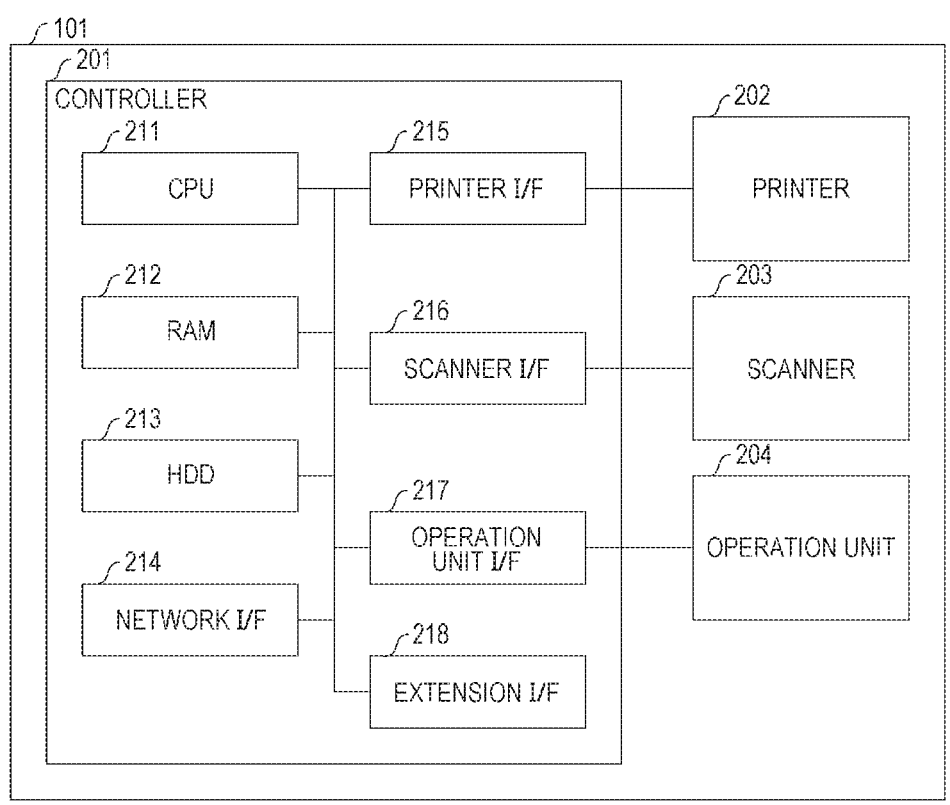
FIG. 2 is a diagram showing an example of a hardware configuration of an image forming apparatus.

Next, a hardware configuration of the image forming apparatus 101 will be described with reference to FIG. 2. FIG. 2 is a diagram showing an example of the hardware configuration of the image forming apparatus 101. The image forming apparatus 101 has a controller 201, a printer 202, a scanner 203, and an operation unit 204.

The controller 201 has a CPU 211, a RAM 212, an HDD 213, a network I/F 214, a printer I/F 215, a scanner IF 216, an operation unit IF 217, and an extension I/F 218.

The CPU 211 controls the entire image forming apparatus 101. The CPU 211 reads a program from the HDD 213, develops the program on the RAM 212, and executes commands stored in the RAM 212, so that information processing of software installed in the image forming apparatus 101 such as processing shown in FIGS. 11 to 14 is realized. The CPU 211 can transmit and receive data to and from the RAM 212, the HDD 213, the network IF 214, the printer I/F 215, the scanner I/F 216, the operation unit I/F 217, and the extension I/F 218.

The RAM 212 is a random access memory. The RAM 212 is an area for temporarily storing the program read by the CPU 211 from the HDD 213. The RAM 212 can store various data necessary for executing the program.

Figure 3A:
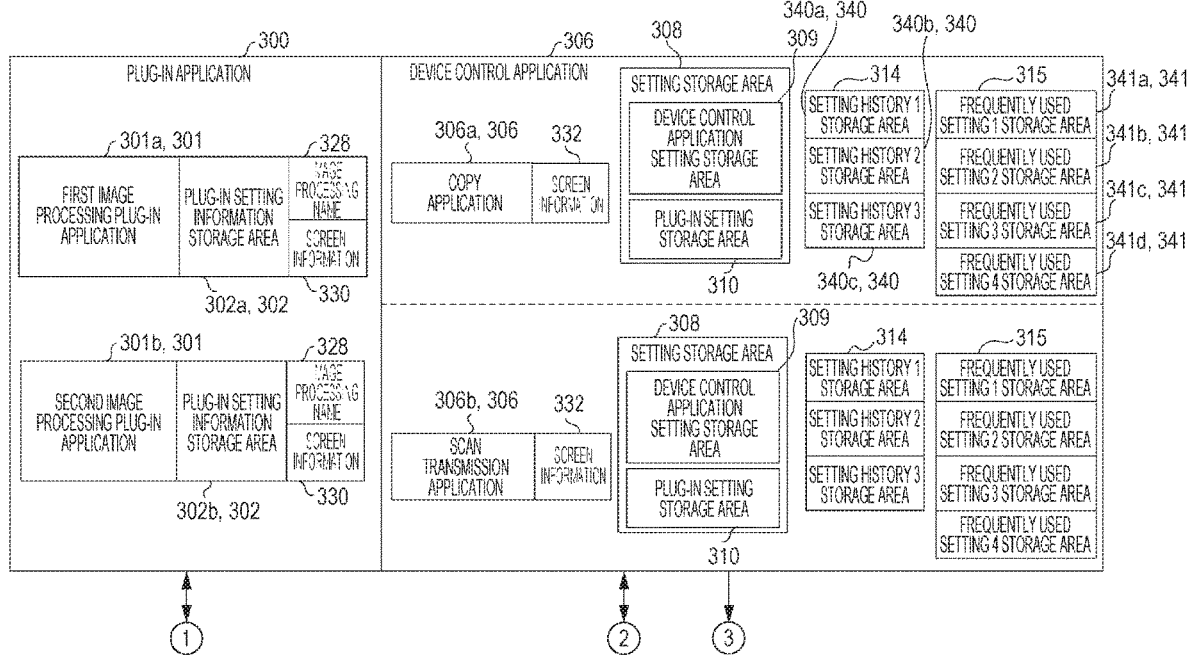
FIGS. 3A and 3B are diagrams showing an example of a software configuration of the image forming apparatus.
Figure 3B:
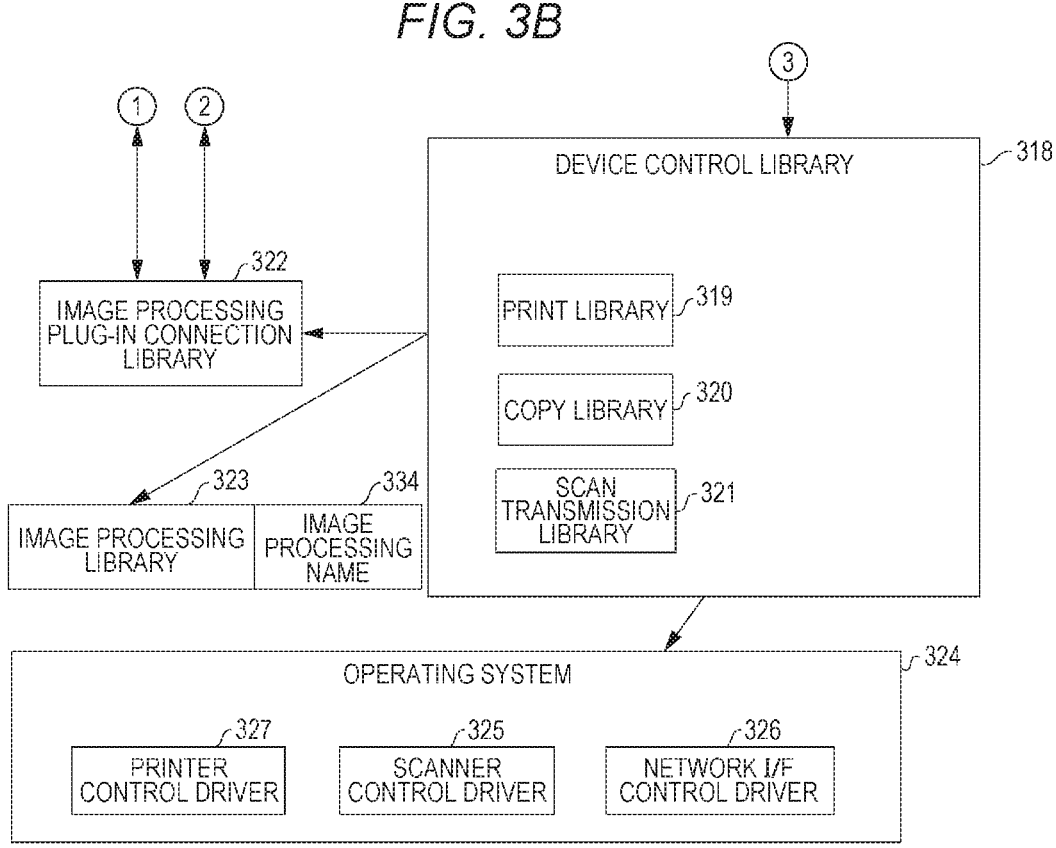

The HDD 213 is a hard disk drive and can store programs and commands that can be executed by the CPU 211, setting information used by the image forming apparatus 101, data related to processing requested from a user, and the like. Programs of software shown in FIGS. 3A and 3B are stored in the HDD 213. The HDD 213 is an example of a storage medium.

The network I/F 214 is an interface for performing network communication with apparatuses in the image forming system. The network I/F 214 can inform the CPU 211 that data reception is performed and can transmit data on the RAM 212 to the network.

The printer I/F 215 is an interface between the controller 201 and the printer 202. The printer I/F 215 can transmit print data transmitted from the CPU 211 to the printer 202 and can transfer a printer state received from the printer 202 to the CPU 211.

The scanner I/F 216 is an interface between the controller 201 and the scanner 203. The scanner I/F 216 can transmit an image reading instruction transmitted from the CPU 211 to the scanner 203 and can transfer image data received from the scanner 203 to the CPU 211. Further, the scanner I/F 216 can transfer a state of the scanner 203 received from the scanner 203 to the CPU 211.

The operation unit I/F 217 is an interface between the controller 201 and the operation unit 204. The operation unit I/F 217 can transfer an instruction from a user inputted from the operation unit 204 to the CPU 211 and can transfer screen information to be operated by a user to the operation unit 204.

The extension I/F 218 is an interface that can connect an external device to the image forming apparatus 101. The extension T/F 218 has, for example, a USB (Universal Serial Bus) type interface. The extension I/F 218 can read/write data by connecting to an external storage apparatus such as a USB memory.

The printer 202 can print image data received from the printer I/F 215 on a paper sheet and can transfer a state of the printer 202 to the printer I/F 215.

The scanner 203 can read image data from a paper sheet placed on the scanner 203, digitalize the image data, and transfer the digitalized image data to the scanner I/F 216 according to an image reading instruction received from the scanner I/F 216. Further, the scanner 203 can transfer a state of the scanner 203 to the scanner I/F 216.

The operation unit 204 is an interface for a user to operate the image forming apparatus 101. The operation unit 204 includes, for example, a liquid crystal screen having a touch panel, provides an operation screen to the user, and receives an operation from the user.

The configuration of the image forming apparatus 101 has been described. However, the configuration of the image forming apparatus 101 is not necessarily limited to the configuration described above. For example, the controller 201 need not necessarily be one hardware unit, but a plurality of hardware units may share processing and function as one unit. On the other hand, one hardware unit may function as a plurality of units by performing various processing operations.

Next, a software configuration of the image forming apparatus 101 will be described with reference to FIGS. 3A and 3B. FIGS. 3A and 3B are diagrams showing an example of the software configuration of the image forming apparatus 101. The software configuration of the image forming apparatus 101 has three layers including a lowest layer, a middle layer, and a highest layer. The middle layer is the second lowest layer.

There is an operating system 324 in the lowest layer of the software configuration of the image forming apparatus 101. The operating system 324 performs program execution management, memory management, and the like. The operating system 324 is incorporated with a scanner control driver 325, a network IF control driver 326, and a printer control driver 327, and the operating system 324 cooperates with each driver.

The scanner control driver 325 controls the scanner 203 through the scanner I/F 216. The network I/F control driver 326 controls the network I/F 214. The printer control driver 327 controls the printer 202 through the printer I/F 215.

There is a device control library 318 in the middle layer of the software configuration of the image forming apparatus 101. The device control library 318 is statically or dynamically linked with a device control application 306 described later. The device control library 318 controls the operating system 324 based on an instruction from each application program. Further, the device control library 318 requests an image processing plug-in connection library 322 and an image processing library 323 to perform image processing. A series of processing for requesting the image processing will be described later. As the device control library 318, there are a print library 319, a copy library 320, and a scan transmission library 321.

The print library 319 is a library that provides API (Application Programming Interface) for controlling a print job by using a function of the printer control driver 327. The print job represents a series of processing such as printing print data stored in the HDD 213 of the image forming apparatus 101 and printing print data received from the information terminal 102 through the network OF 214. The print job is an example of a job that performs image formation.

The copy library 320 is a library that provides API for controlling a copy job by using functions of the scanner control driver 325 and the printer control driver 327. The copy job represents a series of processing where the printer 202 prints image data scanned by the scanner 203. The copy job is an example of a job that performs image formation.

The scan transmission library 321 is a library that provides API for controlling a scan transmission job by using functions of the scanner control driver 325 and the network I/F control driver 326. The scan transmission job represents a series of processing that converts image data scanned by the scanner 203 into a general-purpose format and thereafter transmits the image data to a file server through the network IF 214 or transmits the image data as an e-mail attachment. The scan transmission job is an example of a job that performs image formation.

Further, there is the image processing plug-in connection library 322 and the image processing library 323 in the middle layer of the software configuration of the image forming apparatus 101.

The image processing library 323 is a library that provides API for performing various image processing performed by the CPU 211. More specifically, the various image processing is processing that converts inputted image data into a general-purpose format, sharpness processing, N-in-one printing processing, and the like. The image processing library 323 is installed in the image forming apparatus 101 at the time of factory shipment. The image processing of the image processing library 323 can be used from the time of factory shipment. Each image processing library 323 has a unique image processing name 334. For example, "Sharpness" is set to the image processing name 334 of the image processing library 323 having a sharpness function.

The image processing plug-in connection library 322 is a library that issues an execution instruction to an installed plug-in application 300 according to an image processing execution request from the device control library 318. The image processing plug-in connection library 322 is statically or dynamically linked to the plug-in application 300. The image processing plug-in connection library 322 is also linked with a device control application 306 described later and can transmit and receive setting value information or the like to and from the device control application 306.

The plug-in application 300 is installed by using a remote UI (User Interface) described later or the like, so that the plug-in application 300 is recognized by the image forming apparatus 101. The device control application 306 can acquire a list of plug-in applications 300 that can be used by each device control application by sending an inquiry to the image processing plug-in connection library 322. The plug-in application 300 is an example of a function extension unit that extends functions of the device control application 306.

The highest layer of the software configuration of the image forming apparatus 101 is an application layer. There are the plug-in application 300 and the device control application 306 in the application layer.

The device control application 306 provides various functions by calling each API of the device control library 318. The device control application 306 is a pre-installed application that is previously written to the HDD 213 at the time of factory shipment. In the present embodiment, there are a copy application 306a and a scan transmission application 306b as the device control applications 306. Each device control application 306 holds screen information 332. The CPU 211 displays the screen information of each device control application 306 on the operation unit 204 through the operation unit I/F 217. Each device control application 306 can send an acquisition request of an image processing name 328 of the installed plug-in application 300 to the image processing plug-in connection library 322. Each device control application 306 can send an acquisition request of setting information stored in a plug-in setting information storage area 302 to the image processing plug-in connection library 322. Further, each device control application 306 can send an acquisition request of screen information 330 of the installed plug-in application 300 to the image processing plug-in connection library 322. The device control application 306 is an example of a job execution unit that executes a job that performs image formation.

The copy application 306a executes a copy job by calling API of the copy library 320. The scan transmission application 306b executes a scan transmission job by calling API of the scan transmission library 321.

Each device control application 306 has a self-managed storage area in the HDD 213. The storage area managed by each device control application 306 includes a setting storage area 308, a setting history storage area 314, and a frequently used setting storage area 315.

First, the setting storage area 308 will be described. Each device control application 306 stores setting information used when executing a job into the setting storage area 308 corresponding to the device control application 306. For example, the copy application 306a stores the setting information into the setting storage area 308 of the copy application 306a. The scan transmission application 306b stores the setting information into the setting storage area 308 of the scan transmission application 306b.

The setting storage area 308 stores setting information of each device control application and setting information of the preinstalled image processing library 323. The setting storage area 308 is divided into a device control application setting storage area 309 and a plug-in setting storage area 310 that stores setting of each plug-in application 300. The setting storage area 308 is an example of a first storage area.

Next, the setting history storage area 314 and the frequently used setting storage area 315 will be described. As described later, the image forming apparatus 101 has a setting history function and a frequently used setting function, where some patterns of job setting information are stored in advance and a user selects stored setting information to reproduce job setting information. The setting history storage area 314 is used to realize the setting history function. The frequently used setting storage area 315 is used to realize the frequently used setting function. For example, the copy application 306a stores setting information in the setting history storage area 314 and the frequently used setting storage area 315 of the copy application 306a. The scan transmission application 306b stores setting information in the setting history storage area 314 and the frequently used setting storage area 315 of the scan transmission application 306b.

In the setting history storage area 314, there is a plurality of unit storage areas 340 having the same structure as that of the setting storage area 308. In each unit storage area 340, data of a format stored in the setting storage area 308 can be stored without change. The unit storage areas 340 in the setting history storage area 314 are managed by numbers such as from a setting history "1" storage area 340a to a setting history "3" storage area 340c. The setting history storage area 314 is an example of a second storage area.

In the frequently used setting storage area 315, there is a plurality of unit storage areas 341 having the same structure as that of the setting storage area 308. In each unit storage area 341, data of a format stored in the setting storage area 308 can be stored without change. The unit storage areas 341 in the frequently used setting storage area 315 are managed by numbers such as from a frequently used setting "1" storage area 341a to a frequently used setting "4" storage area 341d. The frequently used setting storage area 315 is an example of a third storage area.

Next, the plug-in application 300 will be described. The plug-in application 300 is an application that can be installed and uninstalled as a plug-in separately from the device control application 306 that is a pre-installed application. A plurality of plug-in applications can be installed in the image forming apparatus 101.

In each plug-in application 300, a program required for an operation is packaged. The program can be installed and uninstalled from a remote UI or the like. The remote UI is a mechanism where a Web browser in an external information terminal 102 accesses the image forming apparatus 101 through the network I/F 214 and it is possible to check a state of the image forming apparatus 101, operate a print job, and perform various settings. The image forming apparatus 101 has a remote UI application as software. The remote UI application installs the plug-in application 300 in the image forming apparatus 101 and uninstalls the plug-in application 300 from the image forming apparatus 101 based on an instruction from the information terminal 102 or the like. It is possible to start up and stop each plug-in application 300 individually.

In the image forming apparatus 101, an image processing plug-in application 301 that provides specific image processing is installed as the plug-in application 300. The specific image processing represents extended image processing different from the image processing library 323 such as format conversion, slant correction, and isolated point removal on an input image. In the image forming apparatus 101 of the present embodiment, a first image processing plug-in application 301a and a second image processing plug-in application 301b are installed as the image processing plug-in application 301.

Each image processing plug-in application 301 has an image processing name 328 as an identifier for identifying an image processing content. For example, in the case of the first image processing plug-in application 301a that performs the slant correction, "Correct Slant" is set as the image processing name 328. In the case of the second image processing plug-in application 301b that performs the isolated point removal, "Remove Isolated Point" is set as the image processing name 328.

Each image processing plug-in application 301 holds screen information 330. The screen information 330 includes information of icon and information of setting screen. The device control application 306 can take in the screen information 330 of the image processing plug-in application 301 and display the screen information 330 on the operation unit 204. Information that is set on the setting screen of plug-in application is stored in the plug-in setting information storage area 302. Each of the plug-in applications 300 such as the image processing plug-in applications 301 and the like has a storage area managed by themselves in the HDD 213. The plug-in setting information storage area 302 is included in the storage area managed by each plug-in application 300. Setting information of the image processing plug-in application 301 stored in the plug-in setting information storage area 302 is an example of first setting information.

Next, an area where the setting information is stored will be described with reference to FIGS. 3C to 3E. FIGS. 3C to 3E are diagrams showing an example of a structure of the area where the setting information is stored.

First, the plug-in setting information storage area 302 of the image processing plug-in application 301 will be described with reference to FIGS. 3C and 3D. FIG. 3C is a diagram showing an example of a plug-in setting information storage area 302a of a first image processing plug-in application 301a. FIG. 3D is a diagram showing an example of a plug-in setting information storage area 302b of a second image processing plug-in application 301b.

In the plug-in setting information storage area 302, setting information of the plug-in application 300 that is set by a user for the plug-in application 300 is stored. For example, in the case of the first image processing plug-in application 301a which is a slant correction application, there are a correction intensity and a correction method as setting items.

In the setting information of the plug-in application 300, information corresponding to a setting item and information corresponding to a setting value are represented in association with each other. More specifically, the setting information of the plug-in application 300 is represented by a KEY-VALUE structure format including KEY which is a character string corresponding to the setting item and VALUE which is a character string corresponding to the setting value. For example, in the example of FIG. 3C, in the plug-in setting information storage area 302a, VALUE: "2" is stored for KEY: "intensity", and VALUE: "document orientation" is stored for KEY: "correction method". Further, in the example of FIG. 3D, in the plug-in setting information storage area 302b, VALUE: "3" is stored for KEY: "intensity". The setting information stored in the plug-in setting information storage area 302 is displayed on the operation unit 204 as the setting information of the image processing plug-in application 301 on a setting history screen 701 described later.

Next, the setting storage area 308 will be described with reference to FIG. 3E. FIG. 3E is a diagram showing an example of the setting storage area 308.

The setting storage area 308 is divided into the device control application setting storage area 309 and the plug-in setting storage area 310. The device control application setting storage area 309 is an area for storing the setting information of the device control application 306 and the setting information of the preinstalled image processing library 323. The plug-in setting storage area 310 is an area for storing the setting information of the plug-in application 300. The setting information of the device control application 306 is an example of second setting information.

The setting storage area 308 is divided for each device control application. The copy application 306a stores setting information in the setting storage area 308 corresponding to the copy application 306a. The scan transmission application 306b stores setting information in the setting storage area 308 corresponding to the scan transmission application 306b.

The setting storage area 308 of the copy application 306a that executes a copy job will be described as an example. In the device control application setting storage area 309 of the copy application 306a, setting information unique to the copy application 306a such as an enlargement ratio, a color/monochrome mode, and the number of copies, is stored. Further, in the device control application setting storage area 309 of the copy application 306a, image processing names that represent image processing performed when a job is executed are listed. For the image processing names listed in the setting storage area 308, the image processing name 334 of the image processing library 323 and the image processing name 328 of the image processing plug-in application 301 are used.

The plug-in setting storage area 310 has a list structure and can store setting information of a plurality of the image processing plug-in applications 301 as long as the capacity of the plug-in setting storage area 310 allows. In the example of FIG. 3E, the plug-in setting storage area 310 stores setting information of the first image processing plug-in application 301a which is a slant correction application. The plug-in setting storage area 310 in FIG. 3E stores "Correct Slant" which is an image processing name of a plug-in having a slant correction function and the setting information of the first image processing plug-in application 301a. In the plug-in setting storage area 310, the setting information of the plug-in setting information storage area 302 transferred from the plug-in application 300 is stored in association with the image processing name 328 of the plug-in application 300.

Figure 4:
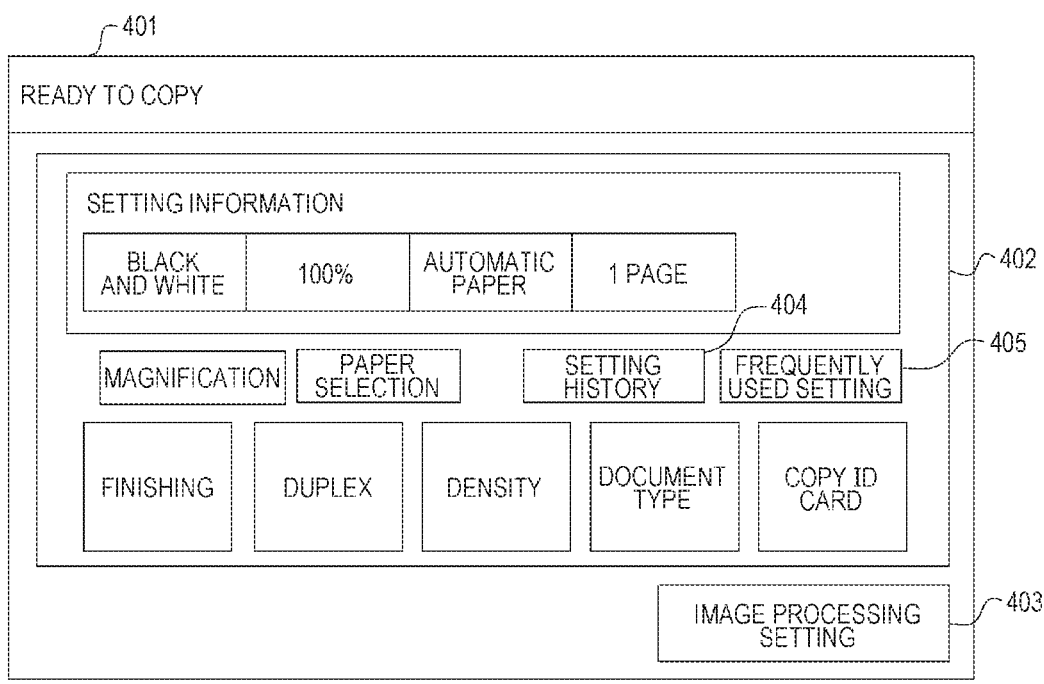
FIG. 4 is a diagram showing an example of a main screen.

Next, a main screen 401 of the copy application 306a will be described with reference to FIG. 4. FIG. 4 is a diagram showing an example of the main screen 401. The main screen 401 is a screen displayed on the operation unit 204. The main screen 401 has a copy application setting section 402 and an image processing setting button 403. The copy application setting section 402 is a setting screen specialized for the copy application 306a. On the copy application setting section 402, settings specialized for a copy job, such as print magnification settings and copy number setting, can be performed. A setting history button 404 included in the copy application setting section 402 is a button for moving to a setting history screen 701. A frequently used setting button 405 included in the copy application setting section 402 is a button for moving to a frequently used setting selection screen 801. The image processing setting button 403 is a button for displaying an image processing setting screen 501 where image processing for a copy job is designated.

Figure 5:
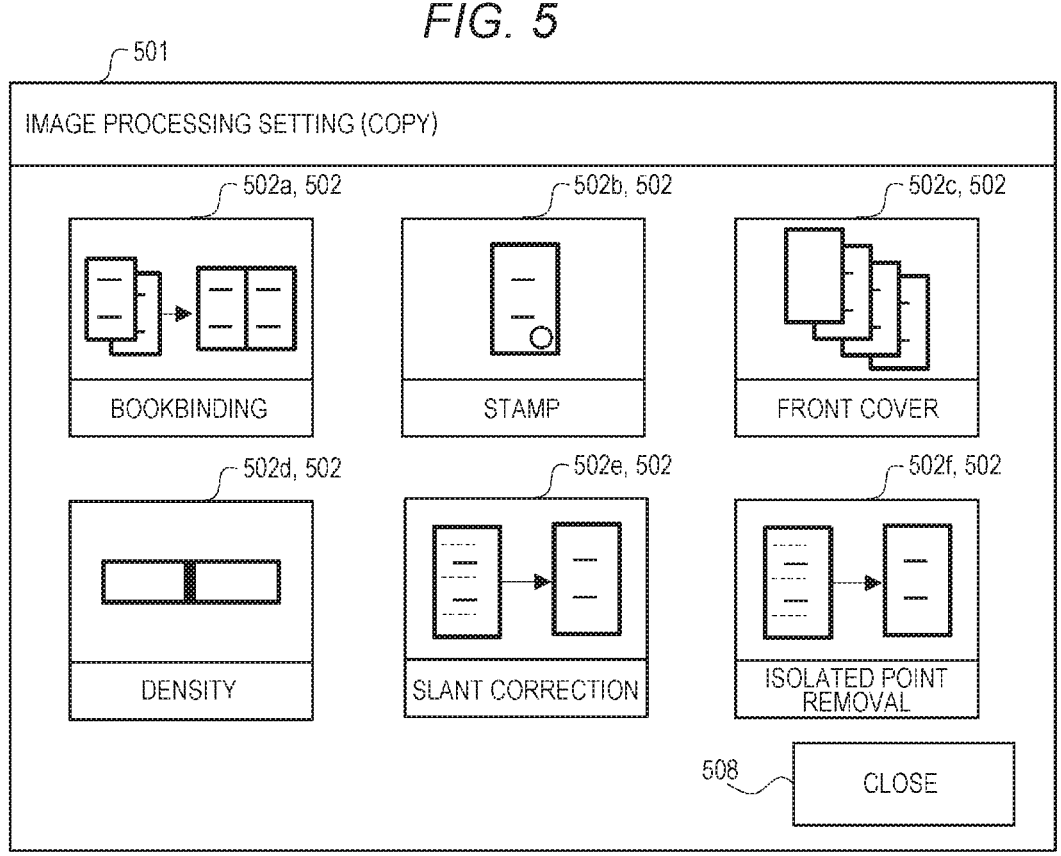
FIG. 5 is a diagram showing an example of an image processing setting screen.

Next, the image processing setting screen 501 will be described with reference to FIG. 5. FIG. 5 is a diagram showing an example of the image processing setting screen 501. The image processing setting screen 501 is a screen displayed on the operation unit 204 after the image processing setting button 403 is selected. On the image processing setting screen 501, icons 502 for setting each image processing are displayed. As the icons 502, there are icons from a first icon 502a to a sixth icon 502f. The icons from the first icon 502a to the fourth icon 502d are icons included in the screen information 332 corresponding to the copy application 306a. The fifth icon 502e and the sixth icon 502f are icons 502 included in the screen information 330 of the image processing plug-in application 301 installed in the image forming apparatus 101. In the example of FIG. 5, the fifth icon 502e represents the first image processing plug-in application 301a that performs the slant correction and the sixth icon 502f represents the second image processing plug-in application 301b that performs the isolated point removal.

The icon 502 included in the screen information 332 of the copy application 306a and the icon 502 included in the screen information 330 of the image processing plug-in application 301 are displayed on the same image processing setting screen 501. When there is a plurality of plug-in applications 300, the icons 502, the number of which is the same as the number of plug-in applications 300, are displayed on the same image processing setting screen 501.

The copy application 306a acquires the icon 502 of the screen information 330 based on the image processing name of the plug-in application 300 registered in the setting storage area 308 of the copy application 306a. Then the copy application 306a displays a list of the acquired icons 502 on the image processing setting screen 501.

The copy application 306a can call the screen information 330 of the plug-in application 300 by using the image processing name of the plug-in application 300 and can perform setting of the plug-in application 300. When the icon 502 of the plug-in application 300 is selected, the copy application 306a acquires a setting screen of the screen information 330 of the plug-in application 300 by using an image processing name corresponding to the selected icon 502.

A close button 508 on the image processing setting screen 501 is a button for moving to the main screen 401 of the copy application 306a.

Figure 6:
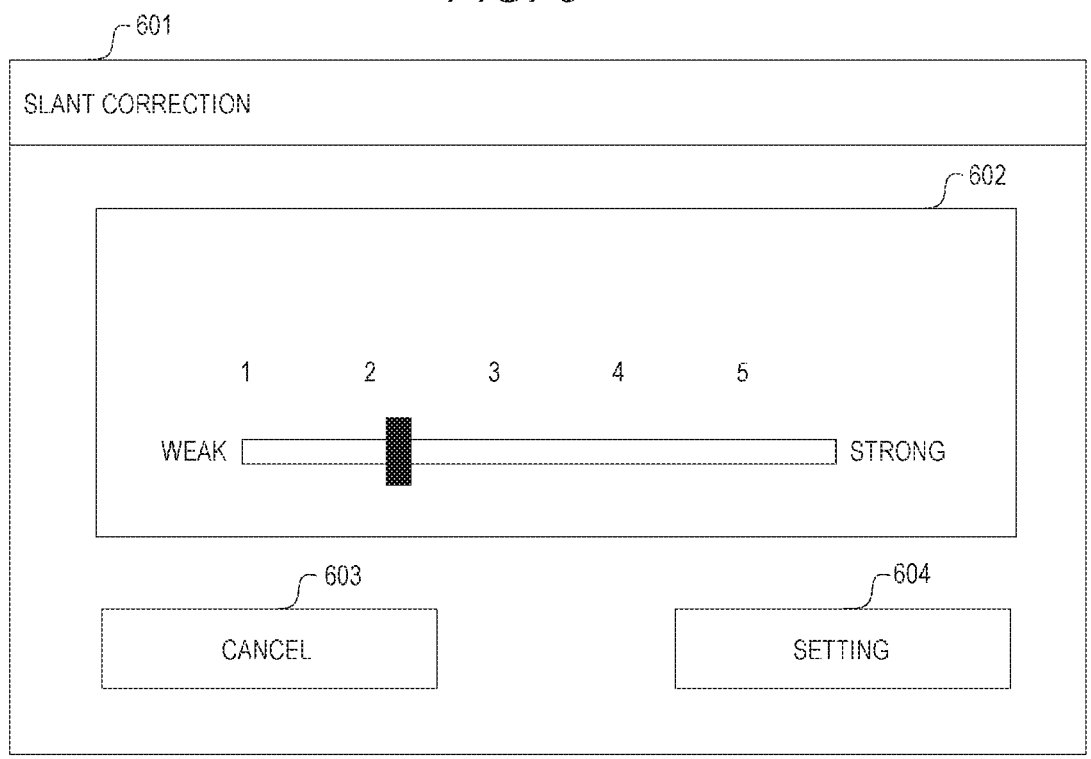
FIG. 6 is a diagram showing an example of a plug-in image processing individual setting screen.

Next, a plug-in image processing individual setting screen 601 will be described with reference to FIG. 6. FIG. 6 is a diagram showing an example of the plug-in image processing individual setting screen 601. The plug-in image processing individual setting screen 601 is an image processing setting screen corresponding to the image processing plug-in application 301 installed in the image forming apparatus 101. FIG. 6 shows the plug-in image processing individual setting screen 601 of the first image processing plug-in application 301a that performs the slant correction. The plug-in image processing individual setting screen 601 includes a plug-in image processing unique setting section 602, a cancel button 603, and a setting button 604. On the plug-in image processing unique setting section 602, it is possible to perform setting on the plug-in image processing, and a check box, a slider, and the like that are required for the setting are displayed. The cancel button 603 is a button for canceling an item inputted in the plug-in image processing unique setting section 602. The setting button 604 is a button for setting an item inputted in the plug-in image processing unique setting section 602. Processing of the setting will be described later.

Figure 7:
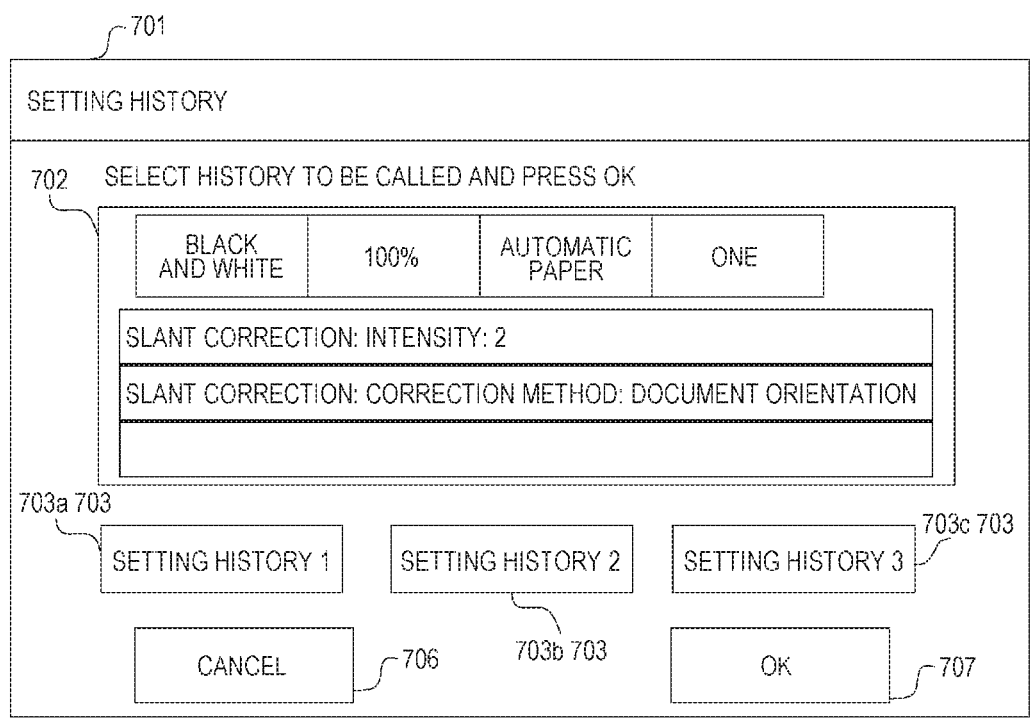
FIG. 7 is a diagram showing an example of a setting history screen.

Next, a setting history screen 701 will be described with reference to FIG. 7. FIG. 7 is a diagram showing an example of the setting history screen 701. The setting history screen 701 is a screen for using a setting history function incorporated in the image forming apparatus 101. The setting history function is a function where the image forming apparatus 101 stores setting information used when jobs have been executed and a user calls the setting information before executing a job and thereby labor of setting is reduced. The image forming apparatus 101 can store a plurality of pieces of setting information. The setting history screen 701 is an example of a first screen where the setting information of the plug-in application 300 is designated. Here, the copy application 306a will be described as an example.

The setting history screen 701 has a setting information display section 702, setting history buttons 703, a cancel button 706, and an OK button 707. The setting information display section 702 displays setting information related to a copy job. The setting history buttons 703 are buttons used when calling history of setting. The cancel button 706 is a button to display the main screen 401. The OK button 707 is a button to reflect history of setting selected by a user.

The setting history buttons 703 include a setting history "1" button 703a, a setting history "2" button 703b, and a setting history "3" button 703c. The setting history "1" button 703a, the setting history "2" button 703b, and the setting history "3" button 703c respectively correspond to the setting history "1" storage area 340a, the setting history "2" storage area 340b, and the setting history "3" storage area 340c in the setting history storage area 314. When one setting history button 703 is selected, setting information in the setting history storage area 314 corresponding to the selected setting history button 703 is read and displayed in the setting information display section 702. Processing related to the setting history screen 701 will be described later.

Figure 8:
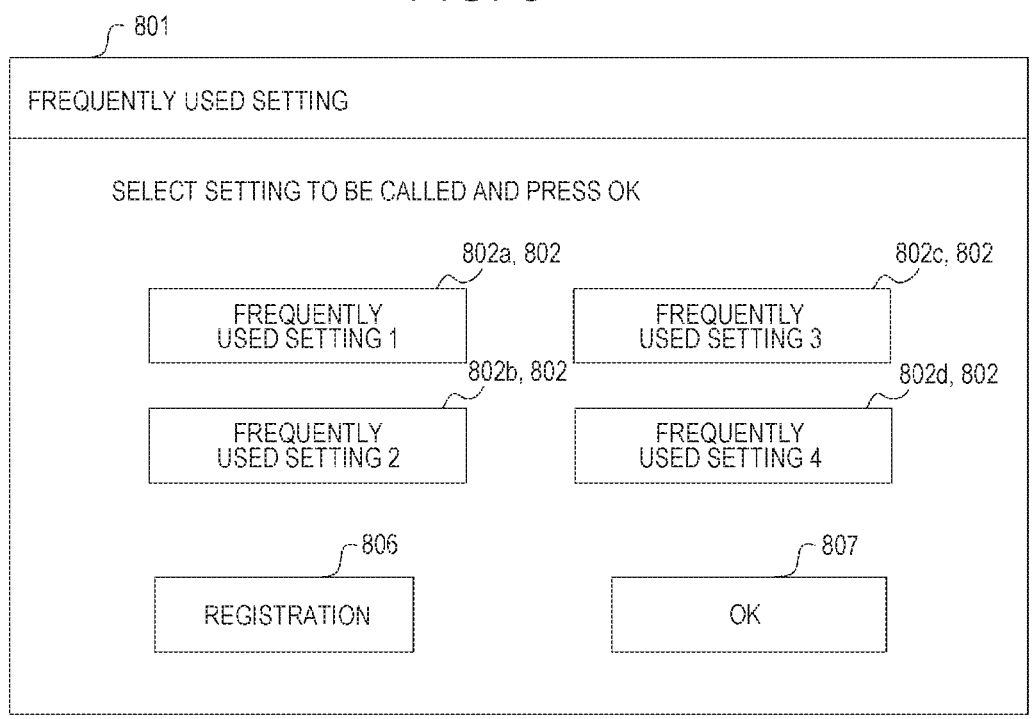
FIG. 8 is a diagram showing an example of a frequently used setting selection screen.

Next, a frequently used setting selection screen 801 will be described with reference to FIG. 8. FIG. 8 is a diagram showing an example of the frequently used setting selection screen. The frequently used setting selection screen 801 is a screen where frequently used settings are selected in the frequently used setting function. The frequently used setting function is a function where a user causes the image forming apparatus 101 to store setting information related to a job and calls the setting information before executing the job and thereby reduces labor of setting. The image forming apparatus 101 can store a plurality of pieces setting information as the frequently used settings. Here, the copy application 306a will be described as an example. The frequently used setting selection screen 801 has frequently used setting buttons 802, a registration button 806, and an OK button 807.

The frequently used setting buttons 802 include a frequently used setting "1" button 802a to a frequently used setting "4" button 802d. The frequently used setting "1" button 802a to the frequently used setting "4" button 802d correspond to the frequently used setting "1" storage area 341a to the frequently used setting "4" storage area 341d in the frequently used setting storage area 315. For example, the frequently used setting "1" button 802a corresponds to the frequently used setting "1" storage area 341a. A user selects a frequently used setting button 802 corresponding to a setting, which the user wants to register or read, and selects the registration button 806 or the OK button 807. Thereby, the image forming apparatus 101 registers or reads the frequently used setting. Specific processing will be described later.

Figure 9:
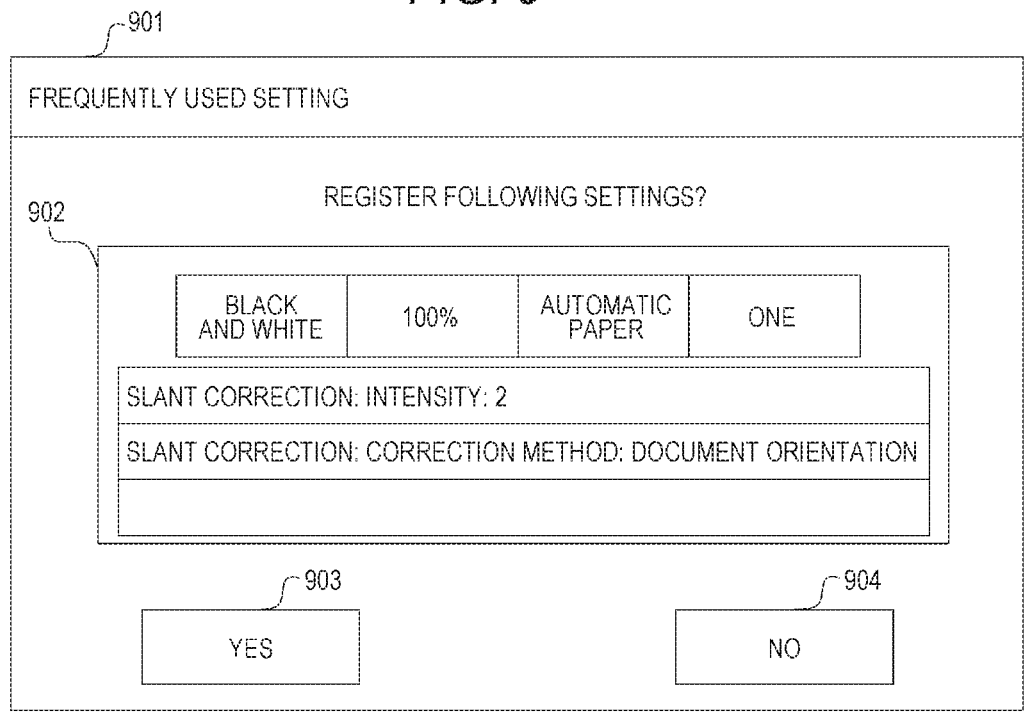
FIG. 9 is a diagram showing an example of a frequently used setting registration screen.

Next, a frequently used setting registration screen 901 will be described with reference to FIG. 9. FIG. 9 is a diagram showing an example of the frequently used setting registration screen 901. The frequently used setting registration screen 901 is displayed on the operation unit 204 when the OK button 807 is selected on the frequently used setting selection screen 801 in FIG. 8. The frequently used setting registration screen 901 has a setting information display section 902, a "YES" button 903, and a "NO" button 904. In the setting information display section 902, setting contents of the setting storage area 308 are displayed. When the "YES" button 903 is selected, setting information in the setting information display section 902 is overwritten, stored, and registered in the unit storage area 341 in the frequently used setting storage area 315 corresponding to the frequently used setting button 802 selected on the frequently used setting selection screen 801. Then, the screen returns to the frequently used setting selection screen 801. When the "NO" button 904 is selected, the frequently used setting is not registered, and the screen returns to the frequently used setting selection screen 801. Processing related to the frequently used setting registration screen 901 will be described later. The frequently used setting registration screen 901 is an example of a second screen where an instruction for registering the setting information of the plug-in application 300 is issued.

Figure 10:
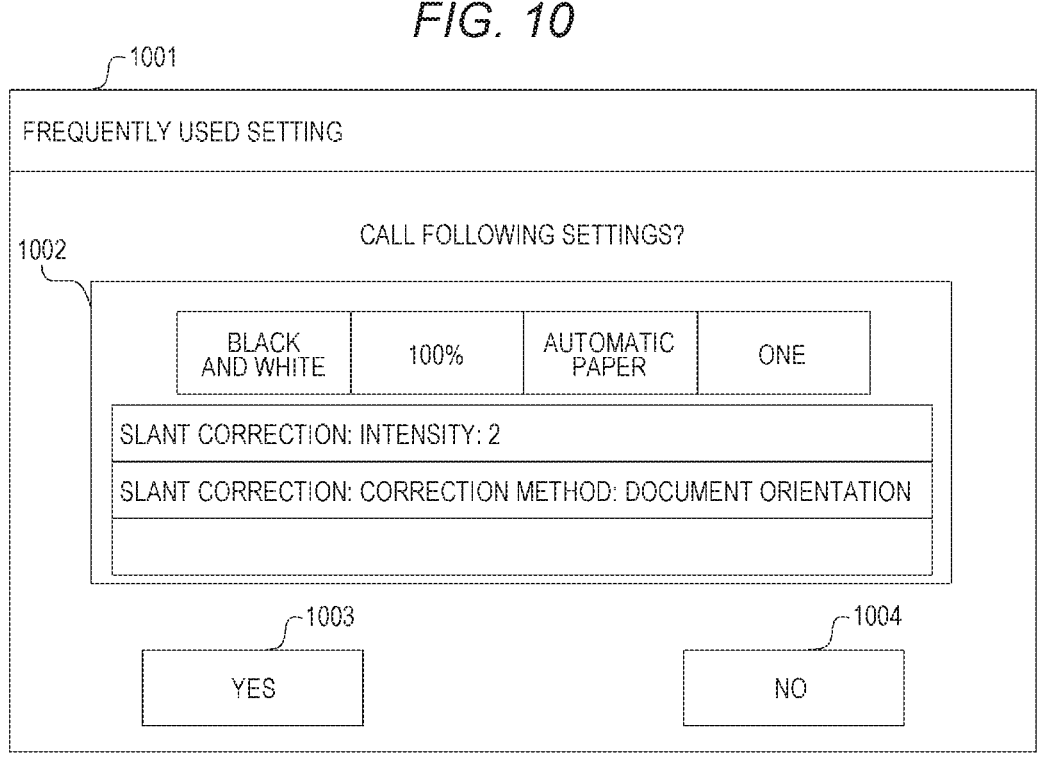
FIG. 10 is a diagram showing an example of a frequently used setting calling screen.

Next, a frequently used setting calling screen 1001 will be described with reference to FIG. 10. FIG. 10 is a diagram showing an example of the frequently used setting calling screen 1001. The frequently used setting calling screen 1001 is displayed on the operation unit 204 when the OK button 807 is selected on the frequently used setting selection screen 801. The frequently used setting calling screen 1001 has a setting information display section 1002, a "YES" button 1003, and a "NO" button 1004. In the setting information display section 1002, setting information stored in the unit storage area 341 in the frequently used setting storage area 315 corresponding to the frequently used setting button 802 selected on the frequently used setting selection screen 801 is displayed. For example, when the frequently used setting "1" button 802a is selected on the frequently used setting selection screen 801, setting information stored in the frequently used setting "1" storage area 341a is displayed in the setting information display section 1002. The frequently used setting "1" storage area 341a is a unit storage area 341 corresponding to the frequently used setting "1" button 802a. When the "YES" button 1003 is selected, read setting information is stored in the setting storage area 308, and the screen returns to the frequently used setting selection screen 801. When the "NO" button 1004 is selected, read contents are discarded, and the screen returns to the frequently used setting selection screen 801. Processing related to the frequently used setting calling screen 1001 will be described later. The frequently used setting calling screen 1001 is an example of a third screen where an instruction for calling the setting information of the plug-in application 300 is issued.

Figure 11B:
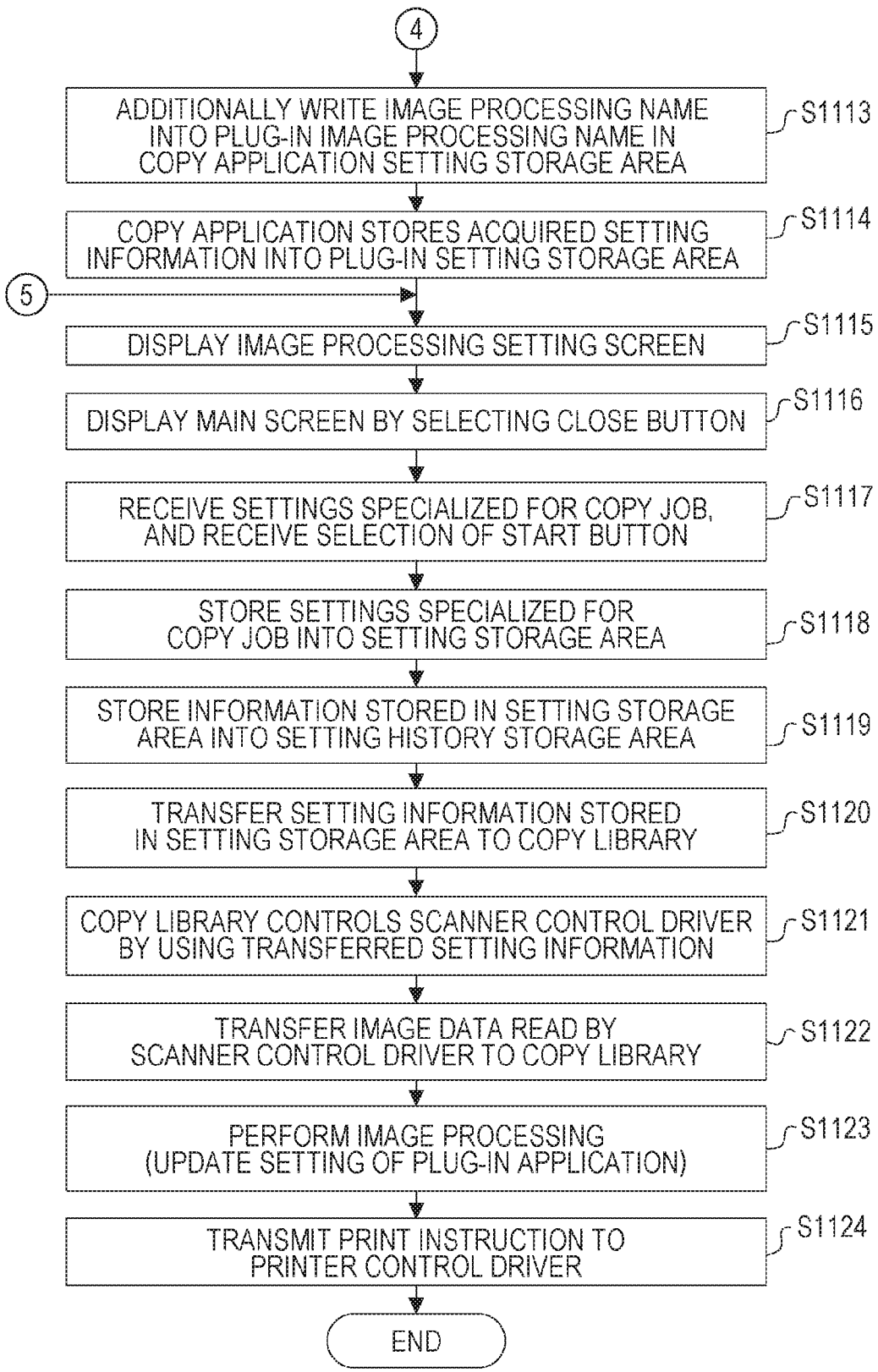

Next, processing related to setting history storage in the copy application 306a will be described with reference to FIGS. 11A and 11B. FIGS. 11A and 11B are a flowchart showing an example of the processing related to the setting history storage. The description of FIGS. 11 to 14 uses an example where the image forming apparatus 101 copies a document by performing processing of slant correction 506 which is plug-in image processing. It is assumed that the main screen 401 shown in FIG. 4 is displayed on the operation unit 204 prior to the processing of FIGS. 11A and 11B.

In S1101, the copy application 306a receives selection of the image processing setting button 403 performed by a user on the main screen 401.

In S1102, the copy application 306a performs control for displaying the image processing setting screen 501 on the operation unit 204.

In S1103, the copy application 306a receives selection of the fifth icon 502e performed by the user on the image processing setting screen 501. The fifth icon 502e represents slant correction.

In S1104, the copy application 306a acquires the image processing name of the plug-in application 300 corresponding to the fifth icon 502e from the device control application setting storage area 309 of the copy application 306a. In the example of FIGS. 11A and 11B, the copy application 306a acquires the image processing name of the first image processing plug-in application 301a. The copy application 306a sends inquiry to the image processing plug-in connection library 322 by using the acquired image processing name.

In S1105, the image processing plug-in connection library 322 identifies the plug-in application 300 from the image processing name acquired from the copy application 306a. In the example of FIGS. 11A and 11B, the image processing plug-in connection library 322 identifies the first image processing plug-in application 301a as the plug-in application 300. The copy application 306a acquires information representing the plug-in application 300 identified by the image processing plug-in connection library 322.

In S1106, the copy application 306a acquires the screen information 330 of the first image processing plug-in application 301a from the first image processing plug-in application 301a.

In S1107, the copy application 306a causes the operation unit 204 to display the plug-in image processing individual setting screen 601 based on the screen information 330 acquired in S1106.

In S1108, the first image processing plug-in application 301a receives the setting information of the first image processing plug-in application 301a designated by the user based on an operation of the user on the plug-in image processing individual setting screen 601. The operation of the user is performed through the operation unit 204.

In S1109, the first image processing plug-in application 301a determines whether the first image processing plug-in application 301a receives selection of the cancel button 603 or selection of the setting button 604. When the first image processing plug-in application 301a determines that the first image processing plug-in application 301a receives selection of the cancel button 603, the first image processing plug-in application 301a advances the processing to S1110, and when the first image processing plug-in application 301a determines that the first image processing plug-in application 301a receives selection of the setting button 604, the first image processing plug-in application 301a advances the processing to S1111.

In S1110, the first image processing plug-in application 301a discards the setting information received in S1108.

In S1111, the first image processing plug-in application 301a stores the setting information received in S1108 into the plug-in setting information storage area 302a of the first image processing plug-in application 301a. In this way, the first image processing plug-in application 301a updates the setting information of the first image processing plug-in application 301a.

In S1112, the copy application 306a acquires the setting information stored in S1111 from the first image processing plug-in application 301a.

In S1113, the copy application 306a additionally writes the image processing name of the first image processing plug-in application 301a acquired in S1104 into a field of the image processing name in the device control application setting storage area 309. The device control application setting storage area 309 where the image processing name is additionally written is the device control application setting storage area 309 included in the setting storage area 308 of the copy application 306a.

In S1114, the copy application 306a stores the setting information of the first image processing plug-in application 301a acquired in S1112 into the plug-in setting storage area 310 in the setting storage area 308. Further, the copy application 306a stores the image processing name of the first image processing plug-in application 301a acquired in S1104 into the plug-in setting storage area 310 in the setting storage area 308. The setting storage area 308 where the setting information and the like are stored in S1114 is the setting storage area 308 of the copy application 306a.

In S1115, the copy application 306a performs control for displaying the image processing setting screen 501 on the operation unit 204.

In S1116, when the copy application 306a receives selection of the close button 508 on the image processing setting screen 501 performed by the user, the copy application 306a performs control for displaying the main screen 401 of the copy application 306a on the operation unit 204.

In S1117, the copy application 306a receives setting information specialized for a copy job, such as print magnification settings and copy number setting, based on an operation performed by the user on the main screen 401. Further, the copy application 306a receives selection of a start button. The start button may be included in the main screen 401, or the operation unit 204 may have the start button. The copy application 306a starts the copy job.

In S1118, the copy application 306a stores the setting information specialized for the copy job received in S1117 into the device control application setting storage area 309 in the setting storage area 308. The setting storage area 308 where the setting information received in S1117 is stored is the setting storage area 308 of the copy application 306a.

In S1119, the copy application 306a copies and stores information stored in the setting storage area 308 into the unit storage area 340 in the setting history storage area 314 of the copy application 306a. More specifically, the copy application 306a stores the information into a unit storage area 340, whose number is the smallest and which is empty, among the unit storage areas 340 of the copy application 306a from the setting history "1" storage area 340a to the setting history "3" storage area 340c. When all the unit storage areas 340 in the setting history storage area 314 are filled, the copy application 306a overwrites and stores the setting information into a unit storage area 340 where the oldest setting information is stored. The setting history storage area 314 can store a plurality of pieces of setting information.

In S1120, the copy application 306a transfers the information stored in the setting storage area 308 to the copy library 320 in order to execute the copy job.

In S1121, the copy library 320 controls the scanner control driver 325 by using the transferred setting information.

In S1122, the scanner control driver 325 controls the scanner 203, reads image data, and transfers the read image data to the copy library 320.

In S1123, the copy library 320 calls API of the first image processing plug-in application 301a through the image processing plug-in connection library 322. More specifically, the copy library 320 calls API of the image processing plug-in connection library 322. Thereafter, the image processing plug-in connection library 322 calls API of the first image processing plug-in application 301a.

In this case, the copy library 320 transfers setting information stored in the plug-in setting storage area 310 in the setting storage area 308 to the first image processing plug-in application 301a through the image processing plug-in connection library 322. The setting information transferred to the first image processing plug-in application 301a is included in the information transferred to the copy library 320 in S1120.

The image processing plug-in connection library 322 identifies the first image processing plug-in application 301a based on an image processing name acquired from the copy library 320 and determines a transfer target of the setting information stored in the plug-in setting storage area 310.

The first image processing plug-in application 301a overwrites and stores setting information transferred from the copy library 320 through the image processing plug-in connection library 322 into the plug-in setting information storage area 302. At this time, the first image processing plug-in application 301a overwrites and stores the setting information into the plug-in setting information storage area 302 of the first image processing plug-in application 301a. Thereby, the setting information transferred from the copy library 320 is reflected as setting of the first image processing plug-in application 301a. Then, the first image processing plug-in application 301a performs slant correction which is image processing of the first image processing plug-in application 301a.

Processing from S1117 to S1123 is an example of processing that causes the plug-in application 300 to perform processing based on the setting information acquired from the plug-in application 300 when receiving an instruction to execute a job.

In S1124, the copy library 320 acquires image data on which image processing is performed from the first image processing plug-in application 301a through the image processing plug-in connection library 322. Then, the copy library 320 transfers the acquired image data to the printer control driver 327 and transmits a print instruction to the printer control driver 327. The printer control driver transmits a print instruction to the printer 202 through the printer I/F 215. The printer 202 prints the image data acquired by the printer control driver 327.

By the above way, the copy job is completed.

Figure 12:
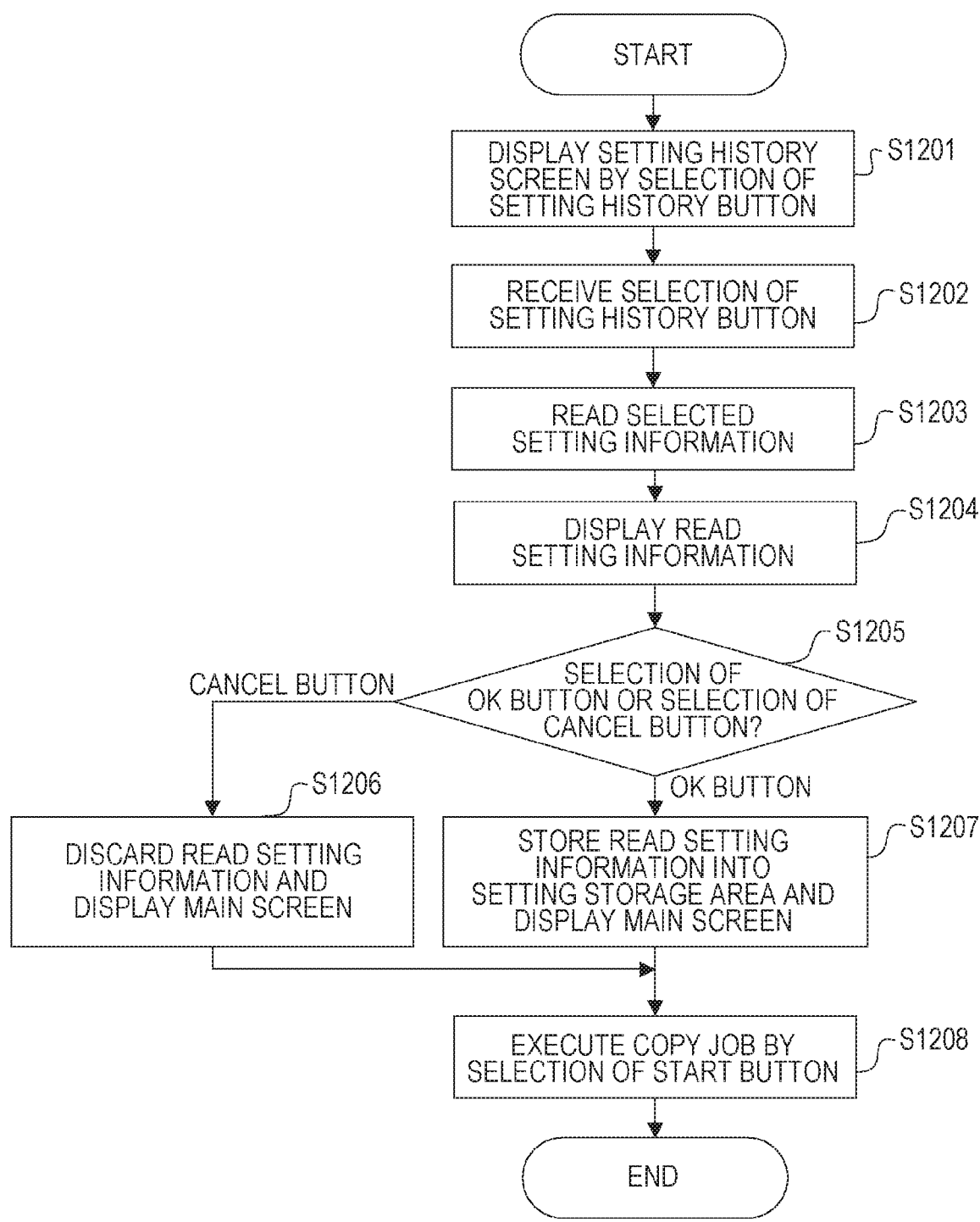
FIG. 12 is a flowchart showing an example of processing related to setting history calling.

Next, processing related to setting history calling in the copy application 306a will be described with reference to FIG. 12. FIG. 12 is a flowchart showing an example of the processing related to the setting history calling.

In S1201, the copy application 306a receives selection of the setting history button 404 performed by a user on the main screen 401 of the copy application 306a. Then, the copy application 306a performs control for displaying the setting history screen 701 on the operation unit 204. The processing of S1201 is an example of processing performed by a first display control unit.

In S1202, the copy application 306a receives selection of one of the setting history buttons 703 performed by the user on the setting history screen 701.

In S1203, the copy application 306a reads setting information in the setting history storage area 314 corresponding to the setting history button 703 received in S1202. For example, when the copy application 306a receives selection of the setting history "1" button 703a, the copy application 306a reads setting information stored in the setting history "1" storage area 340a of the copy application 306a corresponding to the setting history "1" button 703a.

In S1204, the copy application 306a performs control for displaying the setting history screen 701 on the operation unit 204. At this time, the copy application 306a displays the setting information read in S1203 in the setting information display section 702 on the setting history screen 701. As the setting information of the plug-in application 300 included in the setting information in the setting history storage area 314 read in S1203, a character string in the KEY-VALUE structure described above is displayed in the setting information display section 702.

In S1205, the copy application 306a determines whether the copy application 306a receives selection of the cancel button 706 or selection of the OK button 707. When the copy application 306a determines that the copy application 306a receives selection of the cancel button 706, the copy application 306a advances the processing to S1206, and when the copy application 306a determines that the copy application 306a receives selection of the OK button 707, the copy application 306a advances the processing to S1207.

In S1206, the copy application 306a discards the setting information read in S1203, and performs control for displaying the main screen 401 of the copy application 306a on the operation unit 204.

In S1207, the copy application 306a stores the setting information read in S1203 into the setting storage area 308 of the copy application 306a. Then, the copy application 306a performs control for displaying the main screen 401 of the copy application 306a on the operation unit 204.

In S1208, when the copy application 306a receives selection of start button, the copy application 306a executes a copy job by performing processing of S1119 and the subsequent steps in FIGS. 11A and 11B.

Figure 13:
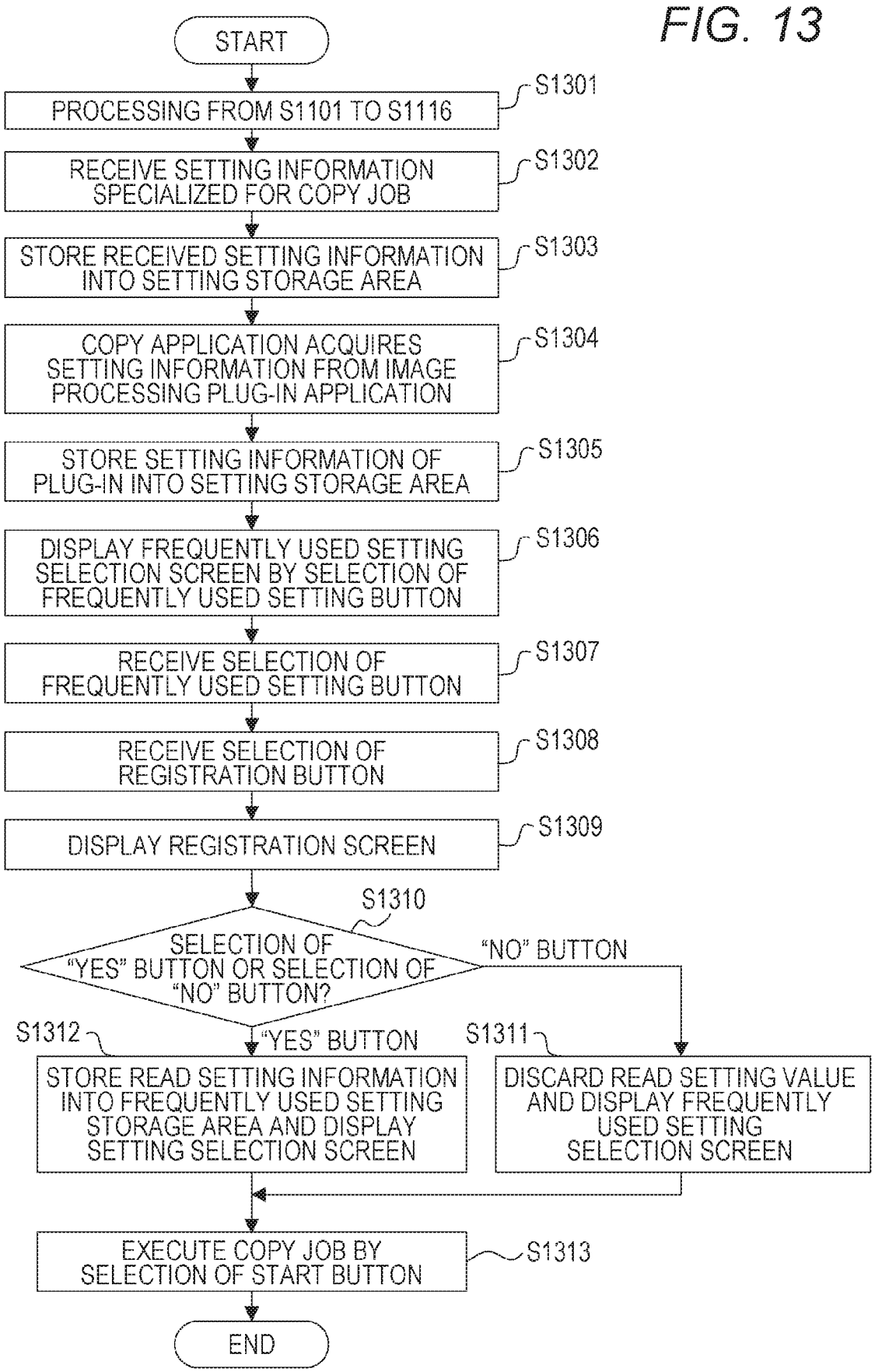
FIG. 13 is a flowchart showing an example of processing related to frequently used setting registration.

Next, processing related to frequently used setting registration in the copy application 306a will be described with reference to FIG. 13. FIG. 13 is a flowchart showing an example of the processing related to the frequently used setting registration.

In S1301, the processing from S1101 to S1116 in FIGS. 11A and 11B is performed.

In S1302, the copy application 306a receives setting information specialized for a copy job, such as print magnification settings and copy number setting, based on an operation performed by a user on the main screen 401.

In S1303, the copy application 306a stores the setting information specialized for a copy job received in S1302 into the device control application setting storage area 309 in the setting storage area 308. The setting storage area 308 where the setting information received in S1302 is stored is the setting storage area 308 of the copy application 306a.

In S1304, the copy application 306a acquires setting information stored in the plug-in setting information storage area 302 of the first image processing plug-in application 301a from the first image processing plug-in application 301a.

In S1305, the copy application 306a stores the setting information of the first image processing plug-in application 301a acquired in S1304 into the plug-in setting storage area 310 in the setting storage area 308. The setting storage area 308 where the setting information is stored in S1305 is the setting storage area 308 of the copy application 306a.

In S1306, the copy application 306a receives selection of the frequently used setting button 405 performed by the user on the main screen 401 of the copy application 306a. Then, the copy application 306a performs control for displaying the frequently used setting selection screen 801 on the operation unit 204.

In S1307, the copy application 306a receives selection of one of the frequently used setting buttons 802 performed by the user on the frequently used setting selection screen 801.

In S1308, the copy application 306a receives selection of the registration button 806 performed by the user on the frequently used setting selection screen 801.

In S1309, the copy application 306a performs control for displaying the frequently used setting registration screen 901 on the operation unit 204. The copy application 306a reads setting information in the frequently used setting storage area 315 of the copy application 306a corresponding to the frequently used setting button 802 selected in S1307. For example, when the copy application 306a receives selection of the frequently used setting "1" button 802a, the copy application 306a reads setting information in the frequently used setting "1" storage area 341a corresponding to the frequently used setting "1" button 802a. The copy application 306a displays the read setting information in the setting information display section 902 on the frequently used setting registration screen 901. The processing of S1309 is an example of processing performed by a second screen display control unit.

In S1310, the copy application 306a determines whether the copy application 306a receives selection of the "YES" button 903 or selection of the "NO" button 904. When the copy application 306a determines that the copy application 306a receives selection of the "YES" button 903, the copy application 306a advances the processing to S1312, and when the copy application 306a determines that the copy application 306a receives selection of the "NO" button 904, the copy application 306a advances the processing to S1311.

In S1311, the copy application 306a discards the setting information read in S1309, and performs control for displaying the frequently used setting selection screen 801 on the operation unit 204.

In S1312, the copy application 306a overwrites and stores the setting information read in S1309 into the unit storage area 341 in the frequently used setting storage area 315 corresponding to the frequently used setting button 802 received in S1307. At this time, the copy application 306a overwrites and stores the setting information into the unit storage area 341 in the frequently used setting storage area 315 of the copy application 306a. For example, when the copy application 306a receives selection of the frequently used setting "1" button 802a, the copy application 306a overwrites and stores the setting information read in S1309 into the frequently used setting "1" storage area 341a. The frequently used setting "1" storage area 341a is the unit storage area 341 corresponding to the frequently used setting "1" button 802a. Then, the copy application 306a performs control for displaying the frequently used setting selection screen 801 on the operation unit 204.

In S1313, when the copy application 306a receives a press of the start button, the copy application 306a executes a copy job by performing processing of SI 119 and the subsequent steps in FIGS. 11A and 11B.

Figure 14:
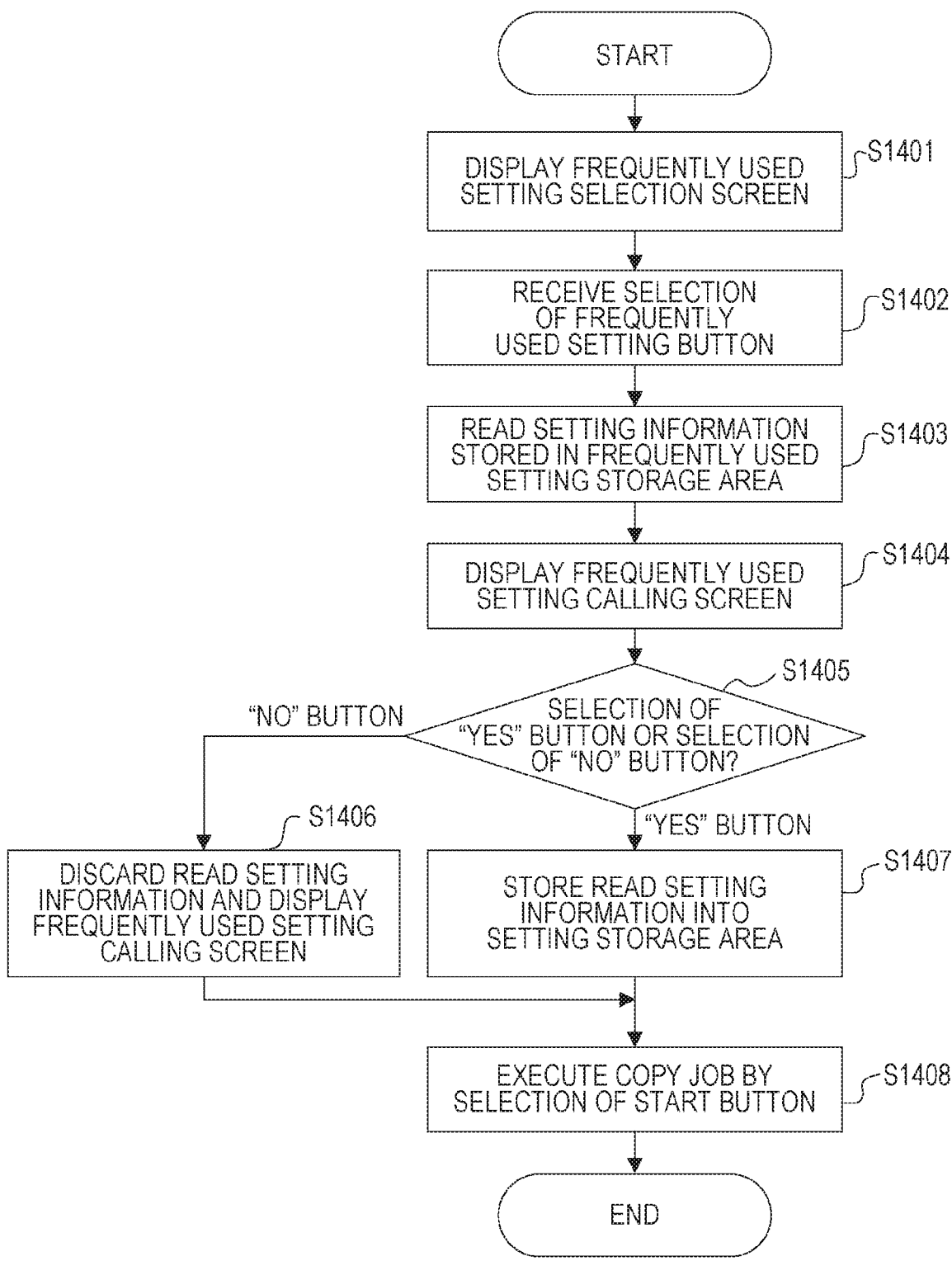
FIG. 14 is a flowchart showing an example of processing related to frequently used setting calling.

Next, processing related to frequently used setting calling in the copy application 306a will be described with reference to FIG. 14. FIG. 14 is a flowchart showing an example of the processing related to the frequently used setting calling.

In S1401, when the copy application 306a receives selection of the frequently used setting button 405 performed by a user on the main screen 401 of the copy application 306a. The copy application 306a performs control for displaying the frequently used setting selection screen 801 on the operation unit 204.

In S1402, the copy application 306a receives selection of one of the frequently used setting buttons 802 performed by the user on the frequently used setting selection screen 801. Then, the copy application 306a receives selection of OK button 807 performed by the user on the frequently used setting selection screen 801.

In S1403, the copy application 306a reads setting information stored in the unit storage area 341 in the frequently used setting storage area 315 corresponding to the frequently used setting button 802 selected in S1402. At this time, the copy application 306a reads setting information stored in the unit storage area 341 in the frequently used setting storage area 315 of the copy application 306a.

In S1404, the copy application 306a performs control for displaying the frequently used setting calling screen 1001 on the operation unit 204. The copy application 306a displays the setting information read in S1403 in the setting information display section 1002. The processing of S1403 is an example of processing performed by a third display control unit.

In S1405, the copy application 306a determines whether the copy application 306a receives selection of the "YES" button 1003 or selection of the "NO" button 1004. When the copy application 306a determines that the copy application 306a receives selection of the "YES" button 1003, the copy application 306a advances the processing to S1407, and when the copy application 306a determines that the copy application 306a receives selection of the "NO" button 1004, the copy application 306a advances the processing to S1406.

In S1406, the copy application 306a discards the setting information read in S1403, and performs control for displaying the frequently used setting calling screen 1001 on the operation unit 204.

In S1407, the copy application 306a stores the setting information read in S1403 into the setting storage area 308 of the copy application 306a, and performs control for displaying the frequently used setting calling screen 1001 on the operation unit 204.

In S1408, when the copy application 306a receives selection of start button, the copy application 306a executes a copy job by performing processing of S1119 and the subsequent steps in FIGS. 11A and 11B.

As described above, the copy application 306a acquires setting information managed by the plug-in application 300 from the plug-in application 300. When executing a copy job, the copy application 306a performs control so that the plug-in application 300 performs processing based on the setting information acquired from the plug-in application 300. Therefore, when executing a copy job, it is possible to use the setting of the plug-in application 300 without a user performing the setting of the plug-in application 300 again. Therefore, convenience of the user is improved.

Further, the copy application 306a acquires setting information managed by the plug-in application 300 from the plug-in application 300. Then, the copy application 306a stores the setting information acquired from the plug-in application 300 into a storage area managed by the plug-in application 300. Therefore, when executing a copy job, the copy application 306a can transfer the setting information of the plug-in application 300 stored in the storage area managed by the plug-in application 300 to the plug-in application 300. When executing a copy job, the copy application 306a can perform control so that the plug-in application 300 performs processing based on the setting information acquired from the plug-in application 300. Therefore, when executing a copy job, it is possible to use the setting of the plug-in application 300 without a user performing the setting of the plug-in application 300 again. Therefore, convenience of the user is improved.

Further, the copy application 306a selects setting information designated by a user from the setting information of the plug-in application 300 that is stored in the storage area managed by the copy application 306a by the setting history function or the frequently used setting function. When executing a copy job, the copy application 306a performs control so that the plug-in application 300 performs processing based on the setting information designated by the user. Therefore, when using the frequently used setting function or the setting history function, the copy application 306a can call back the setting information of the plug-in application 300 along with the setting information of the copy application 306a. Therefore, when executing a copy job, the user can use a desired setting without individually performing setting of the plug-in application 300. Therefore, convenience of the user is improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-204703, filed Oct. 23, 2017, which is hereby incorporated by reference herein in its entirety.

What is claimed is:

1. An image forming apparatus comprising:
at least one memory storing instructions;
at least one processor that, upon execution of the stored instructions is configured to operate as:
a job execution unit configured to execute a job that causes an image to be formed,
wherein the job execution unit acquires, from a function extension unit that provides a function to extend a function of the job execution unit, first setting information related to the function extension unit and managed by the function extension unit, and stores the acquired first setting information and second setting information of the job execution unit in association with each other into a first storage area that is managed by the job execution unit, and
wherein when the job execution unit receives an instruction to execute the job, the job execution unit controls the function extension unit to perform the extended function of the job execution unit based on the first setting information stored in the first storage area, and executes the job based on the second setting information stored in the first storage area.

2. The image forming apparatus according to claim 1, wherein when the job execution unit receives an instruction to execute the job, the job execution unit controls the function extension unit to perform the extended function of the job execution unit based on the first setting information stored in the first storage area.

3. The image forming apparatus according to claim 1, wherein the job execution unit
acquires, from the function extension unit, the first setting information of the function extension unit managed by the function extension unit when the first setting information managed by the function extension unit is updated, and
stores the acquired first setting information into the first storage area.

4. The image forming apparatus according to claim 1, wherein the job execution unit stores the first setting information and an identifier of the function extension unit corresponding to the first setting information in association with each other into a storage area managed by the job execution unit.

5. The image forming apparatus according to claim 1, wherein in the first setting information, information corresponding to a setting item and information corresponding to a setting value are represented in association with each other.

6. The image forming apparatus according to claim 1, further comprising:
an installation unit configured to install the function extension unit in the image forming apparatus; and
an uninstallation unit configured to uninstall the function extension unit from the image forming apparatus.

7. The image forming apparatus according to claim 1, wherein the function extension unit manages the first setting information by storing the first setting information in a storage area managed by the function extension unit.

8. The image forming apparatus according to claim 7, wherein when the job execution unit controls the function extension unit to perform the extended function of the job execution unit based on the acquired first setting information, the function extension unit acquires the first setting information from the job execution unit and stores the acquired first setting information into a storage area managed by the function extension unit.

9. An image forming apparatus comprising
at least one memory storing instructions;
at least one processor that, upon execution of the stored instructions is configured to operate as:
a job execution unit configured to execute a job that causes an image to be formed,
wherein the job execution unit acquires, from a function extension unit that provides a function to extend a function of the job execution unit, first setting information related to the function extension unit and managed by the function extension unit, and stores the acquired first setting information into a first storage area that is managed by the job execution unit, and
wherein when the job execution unit receives an instruction to execute the job, the job execution unit controls the function extension unit to perform the extended function of the job execution unit based on the first setting information stored in the first storage area, and stores the first setting information stored in the first storage area into a second storage area that is managed by the job execution unit.

10. The image forming apparatus according to claim 9, further comprising:
a first display control unit configured to display a first screen where the first setting information is designated based on the first setting information stored in the second storage area,
wherein when the first setting information is designated on the first screen and the job execution unit receives an instruction to execute the job, the job execution unit controls the function extension unit to perform the extended function of the job execution unit based on the first setting information designated on the first screen.

11. The image forming apparatus according to claim 10, wherein when the first setting information is designated on the first screen, the job execution unit stores the first setting information designated on the first screen into the first storage area.

12. An image forming apparatus comprising:
at least one memory storing instructions;
at least one processor that, upon execution of the stored instructions is configured to operate as:
a job execution unit configured to execute a job that causes an image to be formed,
wherein the job execution unit acquires, from a function extension unit that provides a function to extend a function of the job execution unit, first setting information related to the function extension unit and managed by the function extension unit, and stores the acquired first setting information into a first storage area that is managed by the job execution unit,
wherein when the job execution unit receives an instruction to execute the job, the job execution unit controls the function extension unit to perform the extended function of the job execution unit based on the first setting information stored in the first storage area,
wherein the image forming apparatus further comprises a display control unit configured to display a screen where an instruction to register the first setting information is issued, and wherein the job execution unit stores the first setting information for which a registering instruction is issued on the screen into a second storage area that is managed by the job execution unit.

13. The image forming apparatus according to claim 12, wherein the second display control unit displays the second screen where an instruction to register the first setting information stored in the first storage area is issued, and when the instruction to register the first setting information is issued on the second screen, the job execution unit stores the first setting information stored in the first storage area into the third storage area.

14. The image forming apparatus according to claim 12, further comprising:

a third display control unit configured to display a third screen where an instruction to call the first setting information stored in the third storage area is issued based on the first setting information stored in the third storage area, wherein when the instruction to call the first setting information is issued on the third screen and the job execution unit receives an instruction to execute the job, the job execution unit controls the function extension unit to perform the extended function of the job execution unit based on the first setting information for which a calling instruction is issued on the third screen.

15. The image forming apparatus according to claim 14, wherein when the instruction to call the first setting information is issued on the third screen, the job execution unit stores the first setting information for which the calling instruction is issued on the third screen into the first storage area.

16. An information processing method in an image forming apparatus including at least one processor configured to operate as a job execution unit that executes a job that causes an image to be formed and a function extension unit that provides a function to extend a function of the job execution unit, the method comprising:

acquiring, by the job execution unit, from the function extension unit that extends a function of the job execution unit, first setting information related to the function extension unit and managed by the function extension unit;

storing the acquired first setting information and second setting information of the job execution unit in association with each other into a first storage area that is managed by the job execution unit; and wherein, when the job execution unit receives an instruction to execute the job, controlling, by the job execution unit, the function extension unit to perform the extended function of the job execution unit based on the first setting information stored in the first storage area, and executes the job based on the second setting information stored in the first storage area.

17. An information processing method in an image forming apparatus including at least one processor configured to operate as a job execution unit that executes a job that causes an image to be formed and a function extension unit that provides a function to extend a function of the job execution unit, the method comprising:

acquiring, by the job execution unit, from a function extension unit that extends a function of the job execution unit, first setting information related to the function extension unit and managed by the function extension unit;

storing, by the job execution unit, the acquired first setting information into a first storage area that is managed by the job execution unit, and wherein when the job execution unit receives an instruction to execute the job, the job execution unit controls the function extension unit to perform the extended function of the job execution unit based on the first setting information stored in the first storage area, and stores the first setting information stored in the first storage area into a second storage area that is managed by the job execution unit.

18. An information processing method in an image forming apparatus including at least one processor configured to operate as a job execution unit that executes a job that causes an image to be formed, a function extension unit that provides a function to extend a function of the job execution unit and a display control unit configured to display a screen, the method comprising acquiring, from a function extension unit that provides a function to extend a function of the job execution unit, first setting information related to the function extension unit and managed by the function extension unit;

storing the acquired first setting information into a first storage area that is managed by the job execution unit; and wherein when the job execution unit receives an instruction to execute the job, the job execution unit controls the function extension unit to perform the extended function of the job execution unit based on the first setting information stored in the first storage area, and displaying, by the display control unit, a screen where an instruction to register the first setting information is issued, and wherein the job execution unit stores the first setting information for which a registering instruction is issued on the screen into a second storage area that is managed by the job execution unit.

* * * * *